(12) United States Patent
Lieblich et al.

(10) Patent No.: US 11,163,479 B2
(45) Date of Patent: Nov. 2, 2021

(54) REPLICATED STATE CLUSTER WITH STANDBY NODE STATE ASSESSMENT DURING LEADERSHIP TRANSITION

(71) Applicant: EMC IP Holding Company LLC, Hopkinton, MA (US)

(72) Inventors: Yuval Peleg Lieblich, Haifa (IL); Eli Luboshitz, Timrat (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 2 days.

(21) Appl. No.: 16/830,473

(22) Filed: Mar. 26, 2020

(65) Prior Publication Data

US 2021/0303160 A1    Sep. 30, 2021

(51) Int. Cl.
| | | |
|---|---|---|
| *G06F 12/00* | (2006.01) | |
| *G06F 3/06* | (2006.01) | |
| *G06F 13/00* | (2006.01) | |
| *G06F 13/28* | (2006.01) | |

(52) U.S. Cl.
CPC ............ *G06F 3/065* (2013.01); *G06F 3/0604* (2013.01); *G06F 3/067* (2013.01); *G06F 3/0619* (2013.01)

(58) Field of Classification Search
CPC ........ G06F 3/065; G06F 3/0619; G06F 3/067; G06F 3/0604
See application file for complete search history.

(56) References Cited

U.S. PATENT DOCUMENTS

| | | |
|---|---|---|
| 5,551,003 A | 8/1996 | Mattson et al. |
| 5,764,880 A | 6/1998 | Gerdt et al. |
| 6,052,799 A | 4/2000 | Li et al. |
| 6,941,420 B2 | 9/2005 | Butterworth et al. |
| 7,587,465 B1 * | 9/2009 | Muchow ............... G06F 9/5061 709/208 |

(Continued)

FOREIGN PATENT DOCUMENTS

| | | |
|---|---|---|
| WO | PCT/US2019/024885 | 1/2020 |
| WO | PCT/US2019/024900 | 1/2020 |

OTHER PUBLICATIONS

Dell EMC, "Dell EMC VxRack FLEX," Dell EMC Product Overview, 2018, 5 pages.

(Continued)

*Primary Examiner* — Mark A Giardino, Jr.
(74) *Attorney, Agent, or Firm* — Ryan, Mason & Lewis, LLP

(57) ABSTRACT

A replicated state cluster is provided that employs a standby node state assessment during a leadership transition. One method, by a first standby node, comprises monitoring communications from a first cluster leader, wherein the first cluster leader and the first standby node are members of a replicated state cluster; obtaining a designation as a second cluster leader of the replicated state cluster in response to the first cluster leader becoming unavailable; and assessing a state of an additional standby node of the replicated state cluster within a time period after the designation, wherein the additional standby node is available as a candidate leader of the replicated state cluster during the time period when the state of the additional standby node is valid based on one or more validity criteria, wherein the state comprises one or more results of one or more write operations generated by an application.

20 Claims, 10 Drawing Sheets

(56) References Cited

U.S. PATENT DOCUMENTS

| | | | |
|---|---|---|---|
| 9,372,751 | B2 | 6/2016 | McNutt |
| 9,514,014 | B2 | 12/2016 | Webman et al. |
| 10,445,180 | B2 | 10/2019 | Butterworth et al. |
| 10,521,311 | B1* | 12/2019 | Greenwood ........ G06F 11/2028 |
| 2002/0032835 | A1 | 3/2002 | Li et al. |
| 2017/0262519 | A1* | 9/2017 | Horowitz ............ G06F 11/0709 |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2019/0173739 | A1* | 6/2019 | Cui ..................... H04L 43/0817 |
| 2019/0227845 | A1 | 7/2019 | Sridhar et al. |

OTHER PUBLICATIONS

G. Soundararajan et al., "Dynamic Resource Allocation for Database Servers Running on Virtual Storage," FAST 2009: Proceedings of the 7th conference on File and storage technologies, Feb. 2009, pp. 71-84.
Dell EMC, "EMC ScaleIO Basic Architecture Documentation," Technical White Paper, Mar. 2017, 22 pages.
EMC2, "EMC ScaleIO Design Considerations and Best Practices," Technical White Paper, Jun. 2016, 30 pages.
I. Koltsidas et al., "SoftwAre Log-Structured Array (SALSA)—A Unified Stack for SSDs and SMR Disks," IBM Research Report, Dec. 2, 2015, 12 pages.
S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.
https://en.wikipedia.org/wiki/Raft_(computer_science)#Log_Replication.
https://en.wikipedia.org/wiki/Paxos_(computer_science)#Multi-Paxos.
https://en.wikipedia.org/wiki/State_machine_replication#Ordering_Inputs.
https://en.wikipedia.org/wiki/State_machine_replication#Input_Log.
https://en.wikipedia.org/wiki/State_machine_replication#State_Transfer.
U.S. Appl. No. 16/807,709 filed in the name of Avi Puder et al. filed Mar. 3, 2020, and entitled "Management of Shared Resources in a Software-Defined Storage Environment."
U.S. Appl. No. 16/822,818 filed in the name of Itay Keller et al. filed Mar. 18, 2020, and entitled "Storage System Implementing Snapshot Longevity Ranking for Efficient Management of Snapshots."
U.S. Appl. No. 16/822,848 filed in the name of Itay Keller et al. filed Mar. 18, 2020, and entitled "Assignment of Longevity Ranking Values of Storage Volume Snapshots Based on Snapshot Policies."
U.S. Appl. No. 16/823,813 filed in the name of Itay Keller et al. filed Mar. 19, 2020, and entitled "Managing Incompressible Data in a Compression-Enabled Log-Structured Array Storage System."
U.S. Appl. No. 16/343,942 filed in the name of Yonatan Shtarkman et al. filed Apr. 22, 2019, and entitled "Snapshot-Enabled Storage System Implementing Algorithm for Efficient Reclamation of Snapshot Storage Space", published as WO 2020/204880 on Oct. 8, 2020.
U.S. Appl. No. 16/343,949 filed in the name of Asaf Porath et al. filed Apr. 22, 2019, and entitled "Snapshot-Enabled Storage System Implementing Algorithm for Efficient Reading of Data from Stored Snapshots", published as WO 2020/204882 on Oct. 8, 2020.

* cited by examiner

| Write Number | Acknowledgement Status | Node A | Node B | Node C |
|---|---|---|---|---|
| 1 | ✓ | ✓ | ✓ | ✓ |
| 2 | ✓ | ✓ | ✓ | ✓ |
| 3 | ✗ | ✓ | ✓ | ✓ |
| 4 | ✗ | ✓ | ✗ | ✓ |
| 5 | ✗ | ✓ | ✓ | ✗ |
| 6 | ✗ | ✓ | ✗ | ✗ |

FIG. 3

| Write Number | Acknowledgement Status | Node A | Node B | Node C |
|---|---|---|---|---|
| 1 | ✓ | ✓ | ✓ | ✓ |
| 2 | ✓ | ✗ | ✓ | ✓ |
| 3 | ✗ | ✗ | ✓ | ✓ |
| 4 | ✗ | ✗ | ✗ | ✓ |
| 5 | ✗ | ✓ | ✓ | ✗ |
| 6 | ✗ | ✓ | ✗ | ✗ |

| Write Number | Acknowledgement Status | Node A | Node B | Node C |
|---|---|---|---|---|
| 1 | ✓ | ✓ | ✓ | ✓ |
| 2 | ✓ | ✓ | ✓ | ✓ |
| 3 | ✗ | ✗ | ✗ | ✓ |
| 4 | ✗ | ✗ | ✗ | ✗ |
| 5 | ✗ | ✓ | ✓ | ✗ |
| 6 | ✗ | ✓ | ✗ | ✗ |

FIG. 7

REPLICATED STATE CLUSTER WITH STANDBY NODE STATE ASSESSMENT DURING LEADERSHIP TRANSITION

FIELD

The field relates generally to information processing systems, and more particularly, to node clustering in such systems.

BACKGROUND

In many systems, a cluster comprised of several member nodes manages the system and maintains a repository holding the state of the managed system. For example, a replicated state cluster provides a backup repository for an application using a repository file. As an application writes to the repository file, the write operations are replicated across member nodes of the replicated state cluster. When a new node takes control of the replicated state cluster to become the new cluster leader (e.g., following a leader election), the new cluster leader often declares the other cluster members as unsuitable to assume leadership. This may cause the replicated state cluster to have a single point of failure where only one cluster member is fit to lead the cluster.

A need exists for improved techniques for processing a change in leadership of the replicated state cluster.

SUMMARY

In one embodiment, a method comprises monitoring, by a first standby node, communications from a first cluster leader executing on a different device than the first standby node, wherein the first cluster leader and the first standby node are members of a replicated state cluster; obtaining, by the first standby node, a designation as a second cluster leader of the replicated state cluster in response to the first cluster leader becoming unavailable; and assessing, by the first standby node, a state of at least one additional standby node of the replicated state cluster within a time period after the designation, wherein the at least one additional standby node is available as a candidate leader of the replicated state cluster during the time period when the state of the at least one additional standby node is valid based at least in part on one or more validity criteria, wherein the state comprises one or more results of one or more write operations generated by an application.

In some embodiments, the state of the at least one additional standby node is updated during the time period based at least in part on the state of the second cluster leader in response to the state of the at least one additional standby node not being valid based at least in part on the validity criteria. For example, the state of the at least one additional standby node can be updated by synchronizing the state of the at least one additional standby node to the state of the second cluster leader within the time period. Synchronizing the state may comprise evaluating differences between the state of the second cluster leader and the state of the at least one additional standby node and synchronizing only storage blocks that are different between the second cluster leader and the at least one additional standby node. The differences between the state of the second cluster leader and the state of the at least one third device may comprise differences with respect to unacknowledged write operations comprising state information.

Other illustrative embodiments include, without limitation, apparatus, systems, methods and computer program products comprising processor-readable storage media.

BRIEF DESCRIPTION OF THE DRAWINGS

FIGS. 3 through 7 are sample tables illustrating a progression of a state for a series of write operations of three replicas to a replicated state cluster comprising three nodes, according to some embodiments of the disclosure;

DETAILED DESCRIPTION

Figure 1:
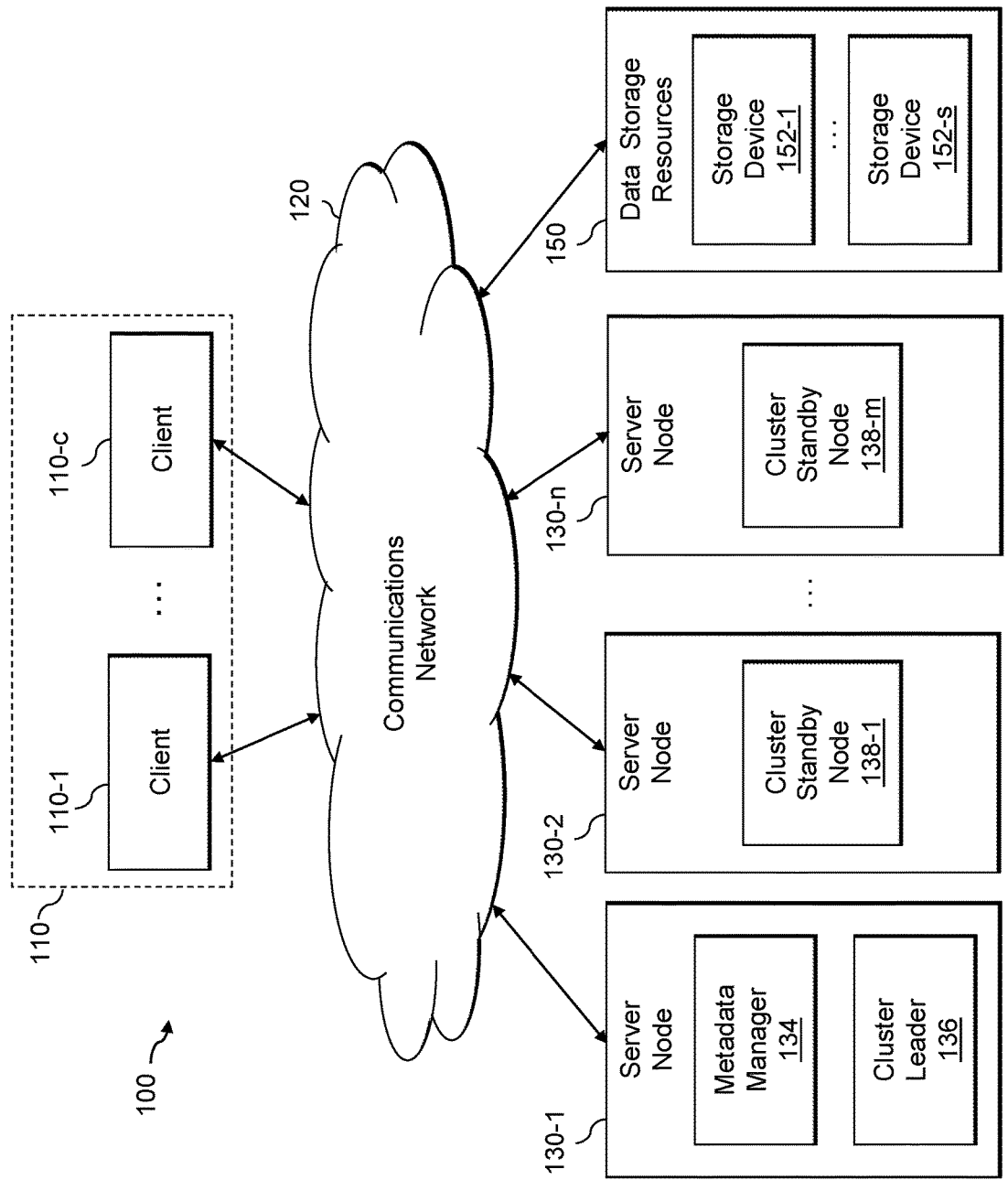
FIG. 1 is a high-level schematic illustration of a computing system comprising a software-defined storage system that implements a process for managing a replicated state cluster with a standby node state assessment during a leadership transition, according to an exemplary embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for implementing a replicated state cluster with a standby node state assessment during a leadership switchover.

In one or more embodiments, techniques are provided to process a change in leadership of the replicated state cluster by assessing the validity of the other cluster members prior to declaring the other cluster members unsuitable to assume leadership. In addition, when a member is nearly-synchronized with the new cluster leader, techniques are provided to synchronize the nearly-synchronized member with the new cluster leader during the leadership transition, as opposed to declaring the nearly-synchronized member as being out of synchronization with the new cluster leader.

In this manner, a valid cluster can be reestablished, thereby avoiding unnecessary large data updates and potentially losing the cluster leader in case of a failure rendering the entire cluster out-of-synchronization.

As discussed further below, a replicated state cluster typically comprises an odd number of members with a cluster leader node, one or more cluster standby nodes and zero or more tiebreaker nodes (where tiebreaker nodes comprise a voting ability for leader elections but do not participate in the replication of state information). The replicated state cluster replaces a traditional file with cluster redundancy, in a known manner. Thus, the replicated state cluster provides a repository file for an application. The application writes to the repository file which is replicated across the members of the replicated state cluster.

The cluster leader maintains a valid repository and updates the other member nodes so they are synchronized with the cluster leader in case another member node needs to assume leadership of the cluster. When a new leader is elected (e.g., upon startup of a system or the current leader fails or becomes unavailable) using a leader election, the new leader ensures that the other member nodes are synchronized with the new leader and have the same data in their repositories. If a repository of one of the other member nodes is not synchronized with the cluster leader, the outdated member node is typically marked as unsuitable to assume leadership.

For example, in some existing replicated state clusters, when a new member node first becomes the cluster leader, the new cluster leader sets the state of the other member nodes to "degraded" thus marking them as unsuitable to become leaders of the cluster. Thereafter, the new cluster leader initiates a full synchronization of the other member nodes to ensure that the repositories of the other member nodes are identical to the repository of the new cluster leader.

This behavior is inherent in non-journaled leader election algorithms for replicated data. Journal-based protocols, on the other hand, such as the Raft family of protocols, solve consensus in a network of unreliable processors (e.g., processors that may fail). Consensus is the process of agreeing on one result among a group of participants. This problem becomes more difficult when the participants or their communication medium may experience failures. Paxos is another family of consensus protocols that may employ a journal. One or more aspects of the present disclosure are consensus based with a consensus on the member nodes having a valid state and that are eligible to become a leader of the cluster. Among other potential benefits, non-journaled leader election algorithms are typically easier to implement, provide better performance (e.g., with only one write operation, instead of the two write operations for journal-based protocols) and exhibit less overhead (e.g., since no reordering is required) relative to journal-based protocols.

When a new leader takes control, the transactions that were not yet acknowledged to the source application must either be committed or rolled back (recovered transactions). Due to the lack of a journal, these unacknowledged transactions cannot be isolated, so the entire state of the cluster leader must be replicated across all of the member nodes using a full synchronization.

In this full synchronization process, the cluster leader sends the entire repository of the cluster leader to the other member nodes. This process takes a relatively long period of time (e.g., a few seconds) in which the cluster has the current cluster leader as a single point of failure. If the cluster leader experiences a failure (or other unavailability) during the synchronization time, there is no other candidate leader node in the cluster that can assume leadership of the cluster, since the state of the other nodes was set to "degraded" by the prior cluster leader.

As noted above, techniques are provided to synchronize the other cluster members with the new cluster leader during the leadership transition, as opposed to declaring the nearly-synchronized member as being out of synchronization with the new cluster leader. In at least one embodiment, a quick assessment is performed to evaluate the validity of the repositories of the other members during the leadership transition. In this manner, cluster members will not be marked as unsuitable and remain viable as candidate leaders that can potentially assume the role of cluster leader, if needed. For example, if the repositories of other cluster members are identical to the repository of the new cluster leader, the other cluster members will not be marked as degraded. Thus, the number of situations where the cluster will have a single point of failure is reduced by avoiding the degraded state when another cluster member is synchronized with the new leader or can get back to a synchronized state during the leadership transition.

In some embodiments, the repositories of the other cluster members are compared to the repository of the new cluster leader using checksums to assess the synchronization state of the backup repositories and synchronizing only storage blocks that are different between the new cluster leader and the other cluster members. In this manner, the amount of time where the replicated state cluster is exposed to a danger of metadata loss due to having only a single copy of data is reduced and avoids declaring a synchronized replica held by one or more of the other cluster members as being out of synchronization due to a leader transition.

In one or more embodiments discussed herein, when a cluster node becomes the new cluster leader, the new cluster leader sends a start synchronization message to the other cluster members but does not set the state of the other cluster members to a "degraded" state for a predefined grace period for the leadership transition. The predefined grace period may be arbitrarily determined in some embodiments based on the predefined timeouts of the system, on the probability of a failure and/or additional parameters deemed appropriate by a person of ordinary skill in the art. If during the predefined grace period a full synchronization between one or more of the other cluster members and the new cluster leader is reached, the one or more other cluster members will stay in a normal state without moving to degraded (and thus be eligible as standby nodes that may serve as a new cluster leader, if needed).

When the predefined grace period expires, if a synchronization was not completed between the repositories of a given other cluster member and the repository of the new cluster leader, the state of the given other cluster member will be set to "degraded." In a cluster with two other cluster members, for example, even if only one other cluster member was synchronized, the replicated state cluster will be able to sustain a failure of the current leader at this sensitive stage.

It is noted that, in at least some embodiments, if an additional standby node was "degraded" when the original leader crashed (or otherwise became unavailable), the additional standby node cannot become leader if the new leader crashes during the predefined grace period. Generally, during the predefined grace period, the state that matters is the acknowledged state of the original leader.

FIG. 1 is a high-level schematic illustration of a computing system comprising a software-defined storage system that implements a process for managing the replicated state cluster with a standby node state assessment during a leadership transition, according to an exemplary embodiment of the disclosure. More specifically, FIG. 1 schematically illustrates a computing system 100 which comprises a plurality of client applications 110-1, 110-2, . . . , 110-c (collectively referred to as client applications 110), a communications network 120, a plurality of server nodes 130-1 through 130-n (collectively referred to as server nodes 130) and data storage resources 150. One or more server nodes 130 may comprise a software-defined storage (SDS) control system (not shown in FIG. 1). The data storage resources 150 comprise a plurality of storage devices 152-1 through 152-s (collectively referred to as storage devices 152).

The client applications 110 include various types of applications that issue data I/O (input/output) requests to access and store data to and from the data storage devices 152 of the data storage resources 150 of the server nodes 130. For example, the client applications 110 include user applications, server applications, database applications, virtual machines and containers. The client applications 110 can be hosted by, and execute on, various types of computing devices and systems including, but not limited to, desktop computers, laptop computers, workstations, computer servers, enterprise servers, rack servers, smart phones and electronic tablets.

While the communications network 120 is generically depicted in FIG. 1, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks. The term "network" as used herein is therefore intended to be broadly construed so as to encompass a wide variety of different network arrangements, including combinations of multiple networks possibly of different types, which enable communication using, e.g., Internet Protocol (IP) or other communication protocols such as Fibre Channel data transfer protocol, and an iSCSI (Internet Small Computer Systems Interface) data transfer protocol, to support storage network connectivity.

In some embodiments, the data storage resources 150 comprise direct-attached storage (DAS) resources (internal and/or external storage resources of the server node 130), wherein the storage devices 152 are virtually pooled into shared block storage by the SDS control system. For example, the storage devices 152 include the same type, or a combination of different types of persistent storage devices (e.g., physical block devices) such as hard disk drives (HDDs), solid-state drives (SSDs) (e.g., flash storage devices), PCIe flash cards, or other types and combinations of non-volatile memory. The data storage resources 150 are directly connected to the server node 130 through, e.g., a host bus adapter, and using suitable protocols such as ATA, SATA, eSATA, NVMe, SCSI and SAS. In an exemplary embodiment, the storage devices 152 include both HDD and SSD storage devices. As is known in the art, SSD storage devices provide faster storage performance than HDD devices.

While FIG. 1 generally depicts the software-defined storage environment having a server cluster of two or more server nodes 130 (e.g., hundreds of server nodes), wherein each server node 130 deploys its own SDS control system, it is to be understood that in other embodiments, the system 100 of FIG. 1 can implement a single server node 130. In this instance, the SDS control system of each server node converts the local storage resources (e.g., DAS resources) of the server node into block storage and contributes the block storage to the server cluster to implement a server-based storage area network (SAN) (e.g., virtual SAN), wherein each server node is part of a loosely coupled server cluster which enables "scale-out" of the software-defined storage environment.

In the software-defined storage environment of FIG. 1, for purposes of discussion, the term "node" or "server node" as used herein refers to a single server node (e.g., one server node 130) which comprises physical block devices (e.g., HDD devices and SSD devices). The SDS control system exposes abstractions of block devices (e.g., virtual block devices). For example, a virtual block device can correspond to a volume of a storage pool. Each virtual block device comprises any number of actual physical storage devices, which are referred to herein as "device groups." For illustrative purposes, it is assumed that each "device group" is homogenous in terms of the type of storage devices within the group (e.g., a device group can include only HDD devices or SSD devices). In addition, different device groups can have the same type of storage device, but a different number of storage devices. For example, a first device group can include 10 HDDs, a second device group can include 100 HDDs, a third device group can include 50 SSDs, and a fourth group can include 100 SSDs.

In general, a software-defined storage system has certain characteristics which provide the impetus for implementing the replicated state cluster with a standby node state assessment during a leadership transition in accordance with the present disclosure, the functions of which will explained in further detail below.

As used herein, the term "replicated state cluster" comprises an odd number of members with a cluster leader node, one or more cluster standby nodes and zero or more tie-breaker nodes. The replicated state cluster replaces a traditional file with cluster redundancy, in a known manner. Thus, the replicated state cluster provides a repository file for an application. The application writes to the repository file which is replicated across the members of the replicated state cluster.

In the exemplary embodiment described herein, the application that writes operations to the repository file is embodied as a metadata manager that maintains state information for the SDS-based computing system 100 of FIG. 1. As shown in FIG. 1, the exemplary server node 130-1 comprises a metadata manager 134 and a cluster leader 136. In addition, one or more additional server nodes 130 comprise one or more cluster standby nodes 138-1 through 138-m. While the metadata manager 134 and the cluster leader 136 are shown on the same server node 130-1 in the embodiment of FIG. 1, the metadata manager 134 and the cluster leader 136 can alternatively be on different server nodes 130.

In some embodiments, the cluster leader 136 and one or more cluster standby nodes 138-1 through 138-m comprise a replicated state cluster. The various members of the replicated state cluster are in continuous communication (for example, via heartbeat messages) that allow the other members of the replicated state cluster to determine when a cluster member becomes unavailable (potentially triggering a leader election and a leader transition in accordance with the present disclosure).

The SDS control system is a component of the software-defined storage environment shown in FIG. 1. In some embodiments, the software-defined storage environment comprises other components such as SDS data clients, which are not specifically shown in FIG. 1. The SDS control system comprises a software layer that is deployed on one or more server nodes 130 and configured to provision, orchestrate and manage the physical data storage resources 150. For example, the SDS control system implements methods that are configured to create and manage storage pools by aggregating capacity from the physical storage devices 152 (e.g., virtual pools of block storage). The SDS control system can divide a storage pool into one or more volumes, wherein the volumes are exposed to client applications 110 (e.g., as block devices).

The SDS control system supports the virtualization of storage by separating the control and management software from the hardware architecture. The SDS control system is configured to abstract storage access services from the underlying storage hardware to thereby control and manage I/O requests issued by the client applications 110, as well as support networking and connectivity. As shown in FIG. 1, the SDS control system is deployed in the data path between the client applications 110 and the physical data storage resources 150, and is configured to respond to data I/O requests from the client applications 110 by accessing the data storage resources 150 to store/retrieve data to/from the storage devices 152 based on the I/O requests.

On the client-side, an SDS data client (SDC) is a lightweight device driver that is deployed in each host application server which hosts one or more of the client applications 110 that require access to the block devices exposed and managed by the SDS control system. The SDC exposes block devices representing the virtual storage volumes that are currently mapped to that host. In particular, the SDC serves as a block driver for a client (server) to access the block storage that is managed by the SDS control system. The SDC provides the operating system or hypervisor (which runs the SDC) with access to the logical block devices (e.g., volumes). The SDCs have knowledge of which SDS control systems (e.g., SDS control system) hold its block data, so multipathing can be accomplished natively through the SDCs. The metadata managers manage SDC to SDS data mapping.

Generally, the metadata manager 134 manages the computing system 100. The metadata manager 134 comprises the metadata required for system operation, such as configuration changes. In one or more embodiments, the metadata manager 134 manages the metadata, the SDCs, SDS, device mappings, volumes, snapshots, system capacity (e.g., device allocations and/or release of capacity), RAID protection, errors and failures, and/or system rebuild tasks (including rebalancing). In addition, user interactions with the computing system 100 are handled by the metadata manager 134 in some embodiments. In a normal input/output (TO) flow, for example, the metadata manager 134 is not part of the data path and user data does not pass through the metadata manager 134. Therefore, the metadata manager 134 is not a performance bottleneck for I/O operations.

In the following discussion, the exemplary metadata manager 134 generates write operations (e.g., the initial state synchronization and ongoing changes) to the cluster leader 136 of the replicated state cluster, and the cluster leader 136 replicates the write operations to the cluster standby nodes 138. In this manner, the replicated state cluster provides a backup storage for the metadata manager 134. In addition, in the following discussion, the exemplary metadata manager 134 receives acknowledgement messages when the write operations are properly received by each member of the replicated state cluster.

In some embodiments, one or more of the cluster standby nodes 138 may be referred to as an "additional standby node," which can include the cluster leader 136 (who has come back online after being unavailable and can now server as the leader again). In a similar manner, the original cluster leader 136 (prior to a leadership transition) can also be the new leader following the leadership transition.

As noted above, computing system 100 comprises a software-defined storage system that implements the disclosed replicated state cluster techniques with a standby node state assessment during a leadership transition. In one exemplary implementation, the software-defined storage system may be implemented using the Dell EMC ScaleIO® software-defined storage product, commercially available from Dell EMC of Hopkinton, Mass. The Dell EMC ScaleIO™ software-defined storage product is also known as the VxFlex Os® and/or PowerFlex™ software-defined storage product.

While the disclosed replicated state cluster techniques employing a standby node state assessment during a leadership transition are illustrated in one or more embodiments in the context of a software-defined storage system, the disclosed techniques may be employed during a leadership transition for any cluster system, as would be apparent to a person of ordinary skill in the art, based on the present disclosure. For example, clusters are also employed to provide a catalog of the nodes on which particular microservices execute in a microservice based architecture, or to maintain the user permissions of a large system.

Figure 2:
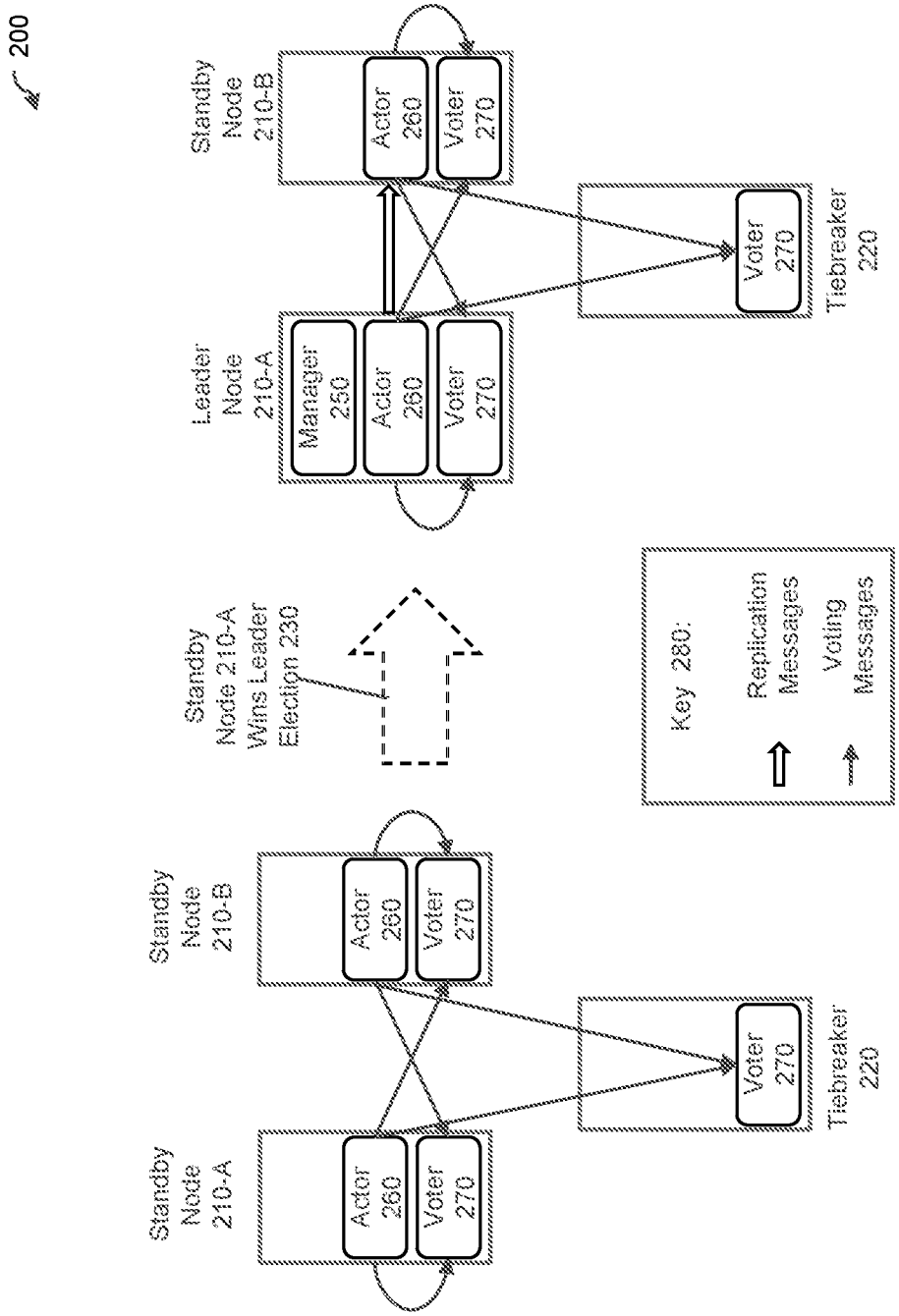
FIG. 2 illustrates an exemplary replicated state cluster initially comprised of two standby nodes and one tiebreaker node, according to an embodiment.

FIG. 2 illustrates an exemplary replicated state cluster 200 initially comprised of two standby nodes 210-A and 210-B and one tiebreaker node 220, according to an embodiment. As noted above, a replicated state cluster typically comprises an odd number of members with one cluster leader node, one or more cluster standby nodes and zero or more tiebreaker nodes. As shown in FIG. 2, at a time 230, the standby node 210-A becomes the leader of the replicated state cluster 200 following a leader election. Thus, in the embodiment of FIG. 2 comprised of three nodes 210-A, 210-B and 220, a given standby node 210 needs at least two votes to become the leader of the replicated state cluster 200 (and also needs an updated (e.g., synchronized) repository to become the leader). Likewise, in an embodiment comprised of five nodes (not shown), a given standby node would need at least three votes to become the leader of the replicated state cluster.

In some embodiments of the present disclosure, the members of a replicated state cluster comprise up to three modules, namely, a manager module 250, an actor module 260 and a voter module 270. A key 280 identifies the nature of various communications among the modules 250, 260, 270.

A tiebreaker node 220 runs only the voter module 270 to receive and process votes from other nodes. A standby node 210 runs the voter module 270, as well as the actor module 260 that allows the standby node 210 to receive and process replication messages from the cluster leader. The application node (e.g., the metadata manager 134) that is replicating its state using the replicated state cluster runs the manager module 250 that allows the application to replicate state messages to the nodes in the replicated state cluster 200.

In the example of FIG. 2, the standby nodes 210 are started with the voter module 270 and the actor module 260. During one possible leader election example, each standby node 210 votes for itself since the local actor 260 is the first to connect to the local voter 270. In addition, the tiebreaker node 220 votes for the standby node 210 that first opened a connection to the tiebreaker node 220. Once a given standby node 210 has two votes, in the present embodiment, the given standby node 210 assumes the role of the cluster leader and starts the manager module 250.

FIG. 3 is a sample table 300 illustrating an initial state for a series of write operations of three replicas to a replicated state cluster comprising nodes A, B, C, according to some embodiments of the disclosure. In the initial state of FIG. 3, the leader node is node A, where node A received 6 write operations and completed all of the write operations locally (e.g., by replicating them to the standby nodes B and C). As shown in FIG. 3, node B did not receive write operations 4 and 6 and node C did not receive write operations 5 and 6. In addition, only write operations 1 and 2 were acknowledged to the originator for the write operations, such as the metadata manager 134.

FIG. 4 is a sample table 400 illustrating a subsequent state for the write operations of the three replicas to the replicated state cluster comprising nodes A, B, C, according to one or more embodiments. In the example of FIG. 4, the leader node A crashed (as represented by the large X through the write operations for node A); and node B was elected to become the leader following a leader election. Node B as the new cluster leader does not know what the state of node A was prior to the crash. In fact, node B does not even know of the existence of write number 6. In addition, only write operations 1 and 2 were still acknowledged to the originator for the write operations, such as the metadata manager 134. Thus, both nodes B and C have valid states (e.g., because their missing write operations (writes 4 and 5 and 5 and 6, respectively) were not acknowledged).

It is noted that with existing leader transition techniques, when node B was elected to become the new cluster leader, following the crash of node A, node B would have declared the state of node B as the "truth." Since the state of node C is not the same as the state of node B in the example of FIG. 4, node B would declare node C as "degraded" until node B synchronized node C, which could take on the order of 5 seconds, for example. Thus, node C cannot become the leader as a result of the "degraded" declaration. If node B then crashes during the leadership transition, before the synchronization is over, node C cannot take leadership, as node C is not synchronized, and the cluster becomes unavailable (during this time, node B is a single point of failure).

Figure 5:
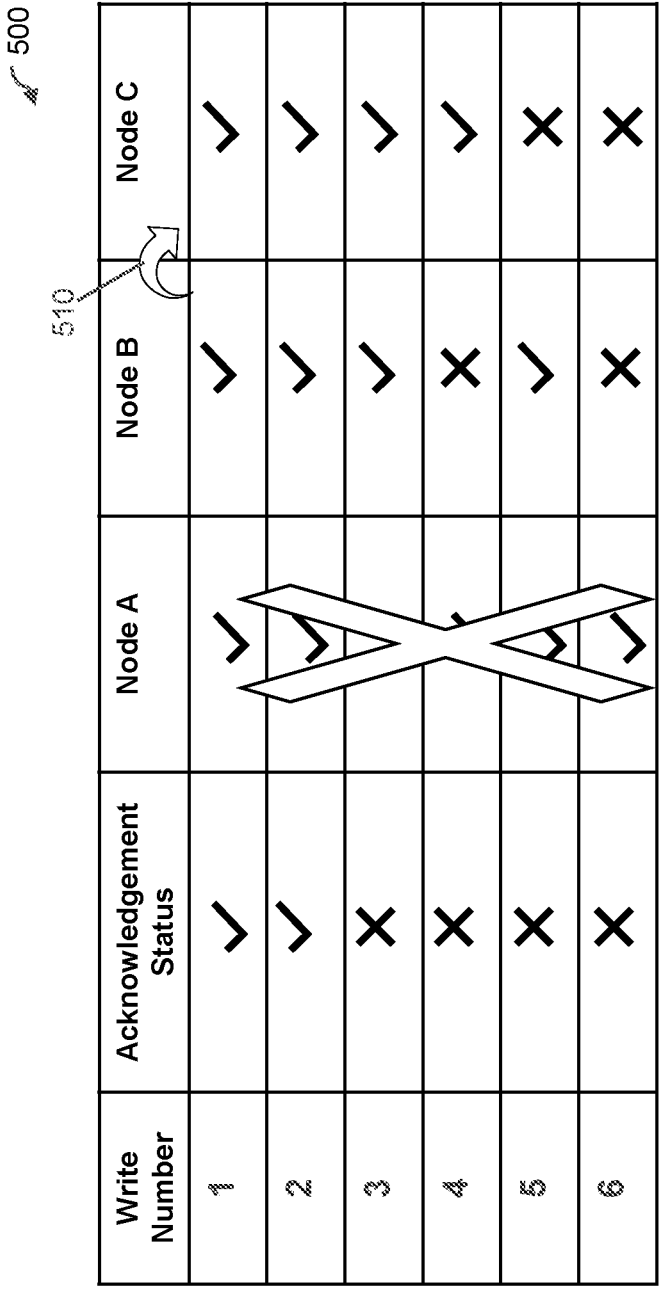

FIG. 5 is a sample table 500 illustrating another subsequent state for the write operations of the three replicas to the replicated state cluster comprising nodes A, B, C, according to an embodiment. In the example of FIG. 5, only write operations 1 and 2 were still acknowledged to the originator for the write operations, such as the metadata manager 134, and both nodes B and C have valid states. The state of the new leader node B is considered to be the correct state. In one or more embodiments of the disclosure, node B attempts to synchronize node C to the state of node B (as represented in FIG. 5 by arrow 510) within a predefined grace period (e.g., 200 msec), before node B declares its own state as the "truth."

Figure 6:
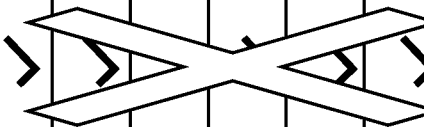

FIG. 6 is a sample table 600 illustrating another subsequent state for the write operations of the three replicas to the replicated state cluster comprising nodes A, B, C, according to some embodiments. In the example of FIG. 6, node B has become the new cluster leader. If node B successfully synchronized node C within the predefined grace period, then the replicated state cluster continues with node B as the new cluster leader and node C as a standby node. If node B failed to synchronize node C during the predefined grace period, however, node B declares C as "degraded" before declaring the state of node B as the "truth."

As shown in FIG. 6, write operation number 4 is updated to show that node C does not have write operation number 4 (as represented in FIG. 6 by arrow 610) to have the state of node C match the state of node B.

FIG. 7 is a sample table 700 illustrating another subsequent state for the write operations of the three replicas to the replicated state cluster comprising nodes A, B, C, according to at least some embodiments of the disclosure. In the example of FIG. 7, cluster leader node B crashed during the predefined grace period (as represented by the large X through the write operations for node B). In addition, the state of standby node C is different than any states that were started with. The only difference, however, is for write operations that were not acknowledged (e.g., among write operation numbers 4-6).

The state of standby node C remains valid, as node B did not declare its own state as the "truth" before crashing (while awaiting the predefined grace period to expire). Thus, node C can become the new cluster leader and the replicated state cluster continues to be available.

Figure 8:
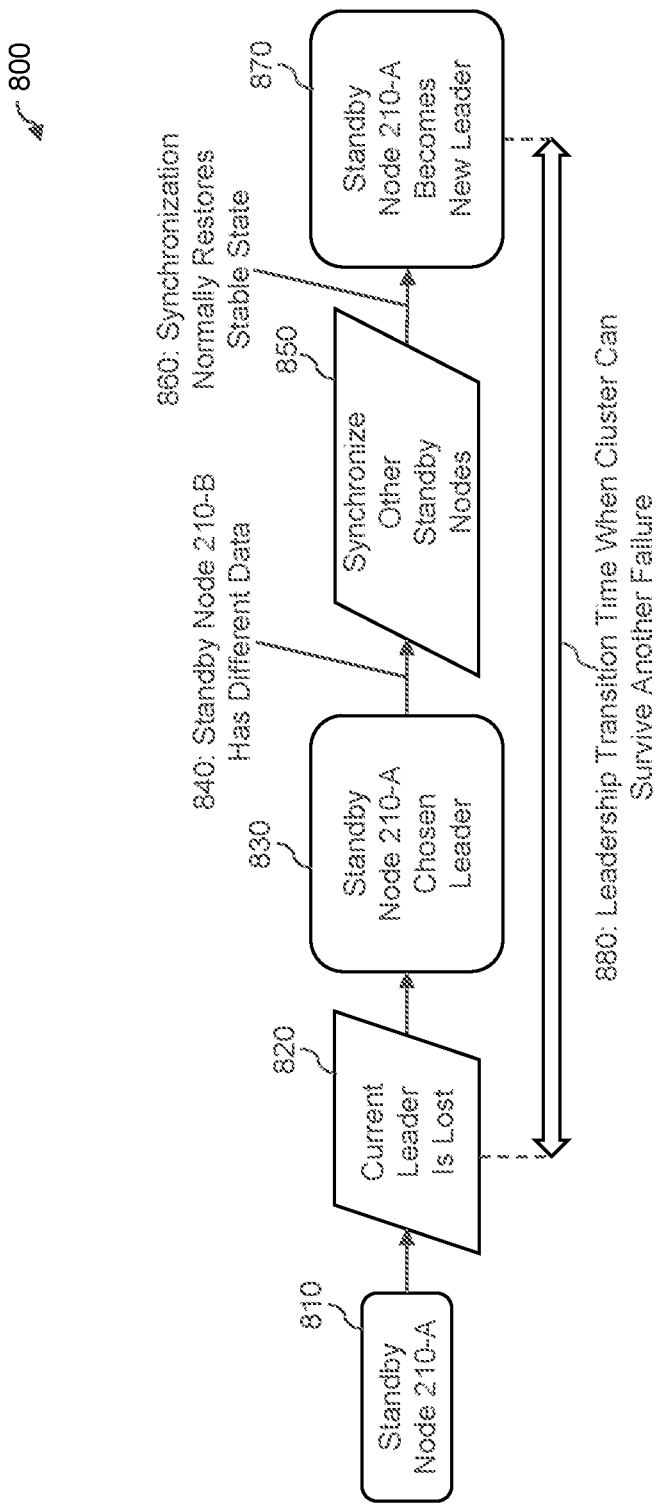
FIG. 8 illustrates a cluster leader transition process comprising a leader election of a new cluster leader for the exemplary replicated state cluster of FIG. 2, according to one or more embodiments of the disclosure.

FIG. 8 illustrates a cluster leader transition process 800 comprising a leader election of a new cluster leader for the exemplary replicated state cluster 200 of FIG. 2, according to one or more embodiments of the disclosure. As shown in FIG. 8, the standby node 210-A is initially in a standby role during step 810. During step 820, the current leader of the replicated state cluster is lost. The loss of the current leader of the replicated state cluster is also a trigger for a leader transition time 880 when the replicated state cluster can survive at least one additional failure using the disclosed standby node state assessment during the leadership transition 800.

During step 830, standby node 210-A is chosen as the new cluster leader following a leader election. At a time 840, standby node 210-B has different data than standby node 210-A. During step 850, standby node 210-A, as the new cluster leader, attempts to synchronize the other standby nodes 210, such as standby node 210-B. At a time 860, a synchronization would normally synchronize the other standby nodes 210 and thereby restore a stable state, allowing the replicated state cluster to remain available. At a time 870, standby node 210-A becomes the new cluster leader and the leadership transition time 880 is over.

It is noted that at time 870, the standby node 210-A becomes the new cluster leader even if synchronization of another standby node 210 has not completed within the predefined grace period.

Figure 9:
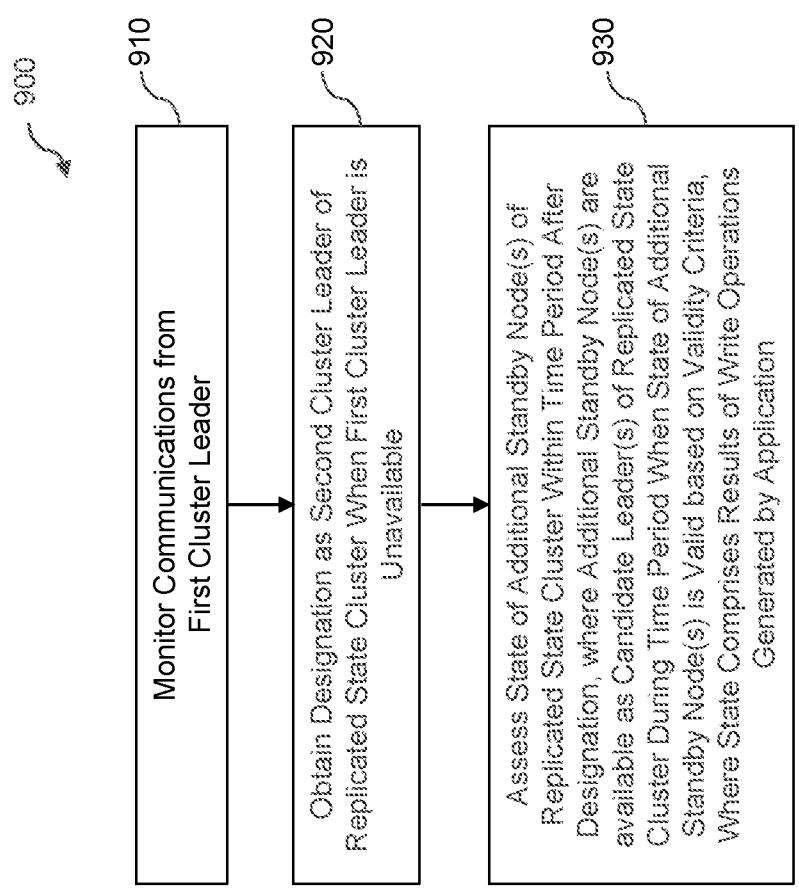
FIG. 9 is a flow chart illustrating an exemplary implementation of a cluster leader transition process that employs a standby node state assessment during the cluster leader transition, according to one embodiment of the disclosure.

FIG. 9 is a flow chart illustrating an exemplary implementation of a cluster leader transition process 900 that employs a standby node state assessment during the cluster leader transition, according to one embodiment of the disclosure. In the example of FIG. 9, the cluster leader transition process 900 is performed by the standby node that becomes the new cluster leader.

As shown in FIG. 9, the exemplary cluster leader transition process 900 initially monitors communications from a first cluster leader during step 910. The first cluster leader and the first standby node are members of a replicated state cluster and normally execute on different devices. During step 920, the exemplary cluster leader transition process 900 obtains a designation as a second cluster leader of the replicated state cluster in response to the first cluster leader becoming unavailable (as detected, for example, by the monitoring step).

Finally, during step 930, the exemplary cluster leader transition process 900 assesses a state of at least one additional standby node of the replicated state cluster within a time period after the designation. The at least one additional standby node is available as a candidate leader of the replicated state cluster during the time period when the state of the at least one additional standby node is valid based at least in part on one or more validity criteria. In at least some embodiments, the state comprises one or more results of one or more write operations generated by an application, such as the metadata manager 134.

The particular processing operations and other network functionality described in conjunction with the flow diagram of FIG. 9 are presented by way of illustrative example only, and should not be construed as limiting the scope of the disclosure in any way. Alternative embodiments can use other types of processing operations to employ a standby node state assessment during the cluster leader transition. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In at least some embodiments, the cluster leader election is performed in three stages. An initial leader selection stage begins when the leader was elected until the predefined grace period expires or all other member nodes are synchronized. During the initial leader selection stage, no other member of the replicated state cluster may assume leadership and the newly elected cluster leader cannot change the state of the other nodes (e.g., degraded or not).

An inactive leader stage begins after the initial leader selection stage ends and lasts until getting a reply from a majority of the voters in the replicated state cluster that are informed about the new state. During the inactive leader stage, the elected leader may not change a state of the voters, and the elected leader will not perform management operations that may require the repository to change.

If during the initial leader selection stage, the elected leader crashes or a full synchronization was completed, the other member nodes of the replicated state cluster are not degraded, and the repository did not change. Therefore, other standby members of the replicated state cluster, which were valid before the new leader took control, are still valid and can assume leadership. In this manner, the replicated state cluster does not reach a state where there is a single point of failure.

Finally, a leadership stage begins after the inactive leader stage ends and lasts until another new leader is to be elected. During the leadership stage, the elected leader manages the system and may declare a standby node as degraded.

Among other benefits, the disclosed techniques for implementing a replicated state cluster with a standby node state assessment during a leadership transition leverages the uncertainty of distributed systems. For example, the disclosed standby node state assessment during a leadership transition allows a given standby node to become a new cluster leader even though the state of the given standby node is only partially synchronized. In this manner, cluster down time is reduced and availability of the replicated state cluster is increased.

Figure 10:
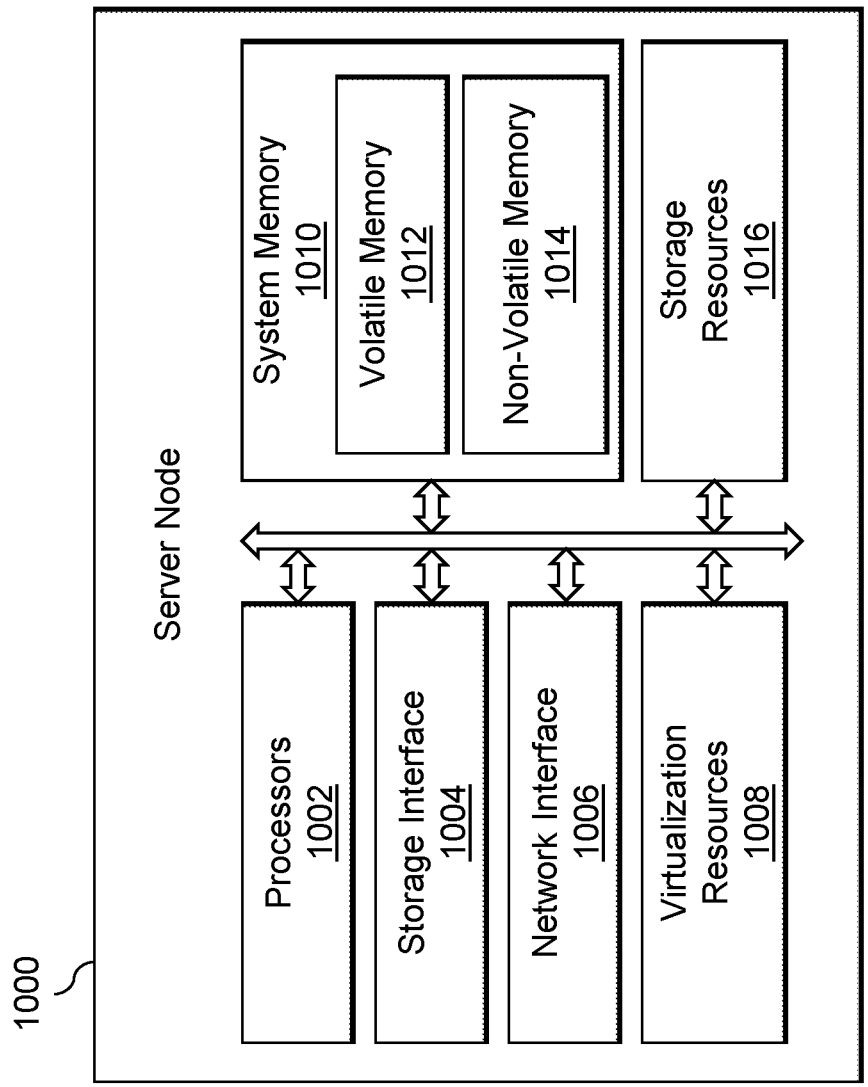
FIG. 10 schematically illustrates framework of a server node which can be implemented in the system of FIG. 1 for hosting a software-defined storage system, according to an exemplary embodiment of the disclosure.

FIG. 10 schematically illustrates a framework of a server node 1000 that can be implemented in the system 100 of FIG. 1 for hosting a software-defined storage control system, according to an exemplary embodiment of the disclosure. In particular, FIG. 10 schematically illustrates an exemplary hardware architecture of the server node 130 of FIG. 1, which can host, for example, entities of the SDS system of FIG. 1. The server node 1000 comprises processors 1002, storage interface circuitry 1004, network interface circuitry 1006, virtualization resources 1008, system memory 1010, and storage resources 1016. The system memory 1010 comprises volatile memory 1012 and non-volatile memory 1014.

The processors 1002 comprise one or more types of hardware processors that are configured to process program instructions and data to execute a native operating system (OS) and applications that run on the server node 1000. For example, the processors 1002 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware and/or firmware. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligent (AI) accelerators, and other types of specialized processors or coprocessors that are configured to execute one or more fixed functions.

The storage interface circuitry 1004 enables the processors 1002 to interface and communicate with the system memory 1010, the storage resources 1016, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), and Fibre Channel. The network interface circuitry 1006 enables the server node 1000 to interface and communicate with a network and other system components. The network interface circuitry 1006 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, and converged Ethernet adaptors) to support communication protocols and interfaces including, but not limited to, PCIe, DMA and RDMA data transfer protocols.

The virtualization resources 1008 can be instantiated to execute one or more services or functions which are hosted by the server node 1000. For example, the virtualization resources 1008 can be configured to implement the various modules and functionalities of the SDS control systems of FIG. 1, as discussed herein. In one embodiment, the virtualization resources 1008 comprise virtual machines that are implemented using a hypervisor platform which executes on the server node 1000, wherein one or more virtual machines can be instantiated to execute functions of the server node 1000. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 1000, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 1008 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 1000 as well as execute one or more of the various modules and functionalities of the SDS control systems of FIG. 1, as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various software modules of the SDS control systems and the replicated state cluster modules that employ a standby node state assessment during a leadership transition, as shown in FIG. 1 comprise program code that is loaded into the system memory 1010 (e.g., volatile memory 1012), and executed by the processors 1002 to perform respective functions as described herein. In this regard, the system memory 1010, the storage resources 1016, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 1010 comprises various types of memory such as volatile RAM, NVRAM, or other types of memory, in any combination. The volatile memory 1012 may be a dynamic random-access memory (DRAM) (e.g., DRAM DIMM (Dual In-line Memory Module), or other forms of volatile RAM. The non-volatile memory 1014 may comprise one or more of a NAND Flash storage device, an SSD device, or other types of next generation non-volatile memory (NGNVM) devices. The system memory 1010 can be implemented using a hierarchical memory tier structure wherein the volatile system memory 1012 is configured as the highest-level memory tier, and the non-volatile system memory 1014 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 1002 to execute a native operating system and one or more applications or processes hosted by the server node 1000, and to temporarily store data that is utilized and/or generated by the native OS and application programs and processes running on the server node 1000. The storage resources 1016 can include, for example, one or more HDDs and/or SSD storage devices.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
monitoring, by a first standby node, communications from a first cluster leader executing on a different device than the first standby node, wherein the first cluster leader and the first standby node are members of a replicated state cluster that provides a repository for an application, wherein one or more write operations generated by the application are replicated in the repository across the members of the replicated state cluster;
obtaining, by the first standby node, a designation as a second cluster leader of the replicated state cluster in response to the first cluster leader becoming unavailable; and
assessing, by the first standby node, a state of at least one additional standby node of the replicated state cluster within a time period after the designation, wherein the at least one additional standby node is available as a candidate leader of the replicated state cluster during the time period when the state of the at least one additional standby node is valid based at least in part on one or more validity criteria, wherein the state comprises one or more results of the one or more write operations generated by the application and wherein the assessing comprises comparing a first repository of the at least one additional standby node of the replicated state cluster to a second repository of the second cluster leader of the replicated state cluster;
wherein the method is performed by at least one processing device comprising a processor coupled to a memory.

2. The method of claim 1, wherein the at least one additional standby node is designated as a third cluster leader in response to the second cluster leader becoming unavailable.

3. The method of claim 1, wherein the state of the at least one additional standby node is updated during the time period based at least in part on the state of the second cluster leader in response to the state of the at least one additional standby node not being valid based at least in part on the one or more validity criteria.

4. The method of claim 3, wherein the state of the at least one additional standby node is updated by synchronizing the state of the at least one additional standby node to the state of the second cluster leader within the time period.

5. The method of claim 4, wherein the synchronizing the state comprises evaluating differences between the state of the second cluster leader and the state of the at least one additional standby node and synchronizing only storage blocks that are different between the second cluster leader and the at least one additional standby node.

6. The method of claim 5, wherein the differences between the state of the second cluster leader and the state of the at least one third device comprise differences with respect to unacknowledged write operations comprising state information.

7. The method of claim 1, wherein the designation as the second cluster leader is obtained following a leader election by the members of the replicated state cluster.

8. The method of claim 1, wherein further write operations comprising state information are suspended during the time period.

9. The method of claim 1, wherein the one or more validity criteria comprises the state of the at least one additional standby node having a same state as the state of the second cluster leader with respect to at least one unacknowledged write operation.

10. An apparatus comprising:
at least one processing device comprising a processor coupled to a memory;
the at least one processing device being configured to implement the following steps:
monitoring, by a first standby node, communications from a first cluster leader executing on a different device than the first standby node, wherein the first cluster leader and the first standby node are members of a replicated state cluster that provides a repository for an application, wherein one or more write operations generated by the application are replicated in the repository across the members of the replicated state cluster;
obtaining, by the first standby node, a designation as a second cluster leader of the replicated state cluster in response to the first cluster leader becoming unavailable; and
assessing, by the first standby node, a state of at least one additional standby node of the replicated state cluster within a time period after the designation, wherein the at least one additional standby node is available as a candidate leader of the replicated state cluster during the time period when the state of the at least one additional standby node is valid based at least in part on one or more validity criteria, wherein the state comprises one or more results of the one or more write operations generated by the application and wherein the assessing comprises comparing a first repository of the at least one additional standby node of the replicated state cluster to a second repository of the second cluster leader of the replicated state cluster.

11. The apparatus of claim 10, wherein the at least one additional standby node is designated as a third cluster leader in response to the second cluster leader becoming unavailable.

12. The apparatus of claim 10, wherein the state of the at least one additional standby node is updated during the time period based at least in part on the state of the second cluster leader in response to the state of the at least one additional standby node not being valid based at least in part on the one or more validity criteria.

13. The apparatus of claim 10, wherein the designation as the second cluster leader is obtained following a leader election by the members of the replicated state cluster.

14. The apparatus of claim 10, wherein further write operations comprising state information are suspended during the time period.

15. The apparatus of claim 10, wherein the one or more validity criteria comprises the state of the at least one additional standby node having a same state as the state of the second cluster leader with respect to at least one unacknowledged write operation.

16. A non-transitory processor-readable storage medium having stored therein program code of one or more software programs, wherein the program code when executed by at least one processing device causes the at least one processing device to perform the following steps:
monitoring, by a first standby node, communications from a first cluster leader executing on a different device than the first standby node, wherein the first cluster leader and the first standby node are members of a replicated state cluster that provides a repository for an application, wherein one or more write operations generated by the application are replicated in the repository across the members of the replicated state cluster;
obtaining, by the first standby node, a designation as a second cluster leader of the replicated state cluster in response to the first cluster leader becoming unavailable; and
assessing, by the first standby node, a state of at least one additional standby node of the replicated state cluster within a time period after the designation, wherein the at least one additional standby node is available as a candidate leader of the replicated state cluster during the time period when the state of the at least one additional standby node is valid based at least in part on one or more validity criteria, wherein the state comprises one or more results of the one or more write operations generated by the application and wherein the assessing comprises comparing a first repository of the at least one additional standby node of the replicated state cluster to a second repository of the second cluster leader of the replicated state cluster.

17. The non-transitory processor-readable storage medium of claim 16, wherein the at least one additional standby node is designated as a third cluster leader in response to the second cluster leader becoming unavailable.

18. The non-transitory processor-readable storage medium of claim 16, wherein the state of the at least one additional standby node is updated during the time period based at least in part on the state of the second cluster leader in response to the state of the at least one additional standby node not being valid based at least in part on the one or more validity criteria.

19. The non-transitory processor-readable storage medium of claim 16, wherein the designation as the second cluster leader is obtained following a leader election by the members of the replicated state cluster.

20. The non-transitory processor-readable storage medium of claim 16, wherein the one or more validity criteria comprises the state of the at least one additional standby node having a same state as the state of the second cluster leader with respect to at least one unacknowledged write operation.

* * * * *